W. VOGLER.

PILLOW OR CUSHION.

No. 11,514. Reissued Nov. 19, 1895.

Witnesses.
E. L. Harlow
L. H. Brown

Inventor.
William Vogler
By J. L. Rick
Atty

UNITED STATES PATENT OFFICE.

WILLIAM VOGLER, OF SOMERVILLE, MASSACHUSETTS, ASSIGNOR TO THE AMERICAN METALLIC CUSHION COMPANY, OF WEST VIRGINIA.

PILLOW OR CUSHION.

SPECIFICATION forming part of Reissued Letters Patent No. 11,514, dated November 19, 1895.

Original No. 527,634, dated October 16, 1894. Application for reissue filed July 31, 1895. Serial No. 557,798.

*To all whom it may concern:*

Be it known that I, WILLIAM VOGLER, of Somerville, county of Middlesex, and State of Massachusetts, have invented an Improvement in Pillows or Cushions, of which the following description, in connection with the accompanying drawings, is a specification, like letters and figures on the drawings representing like parts.

Pillows and cushions are commonly filled with feathers, hair, and other material. The feathers are very soft, and, as does the hair, they retain the heat of the person and are therefore objectionable.

Attempts have been made to utilize metal in pillows and cushions, and wire-cloth has been so employed to some extent.

My invention has for its object the production of a novel pillow or cushion composed of metal, the same consisting of bottom and intermediate frames or sections, one of which is expansible, the said frames being connected together by preferably a series of spring wires or ribs, the parts being so constructed and assembled that when weight is applied to the pillow or cushion to compress its series of springs one of the frames, which is expansible, expands and permits the top of the pillow or cushion to descend and conform in part to part of the form resting against or on the pillow or cushion.

Figure 1:
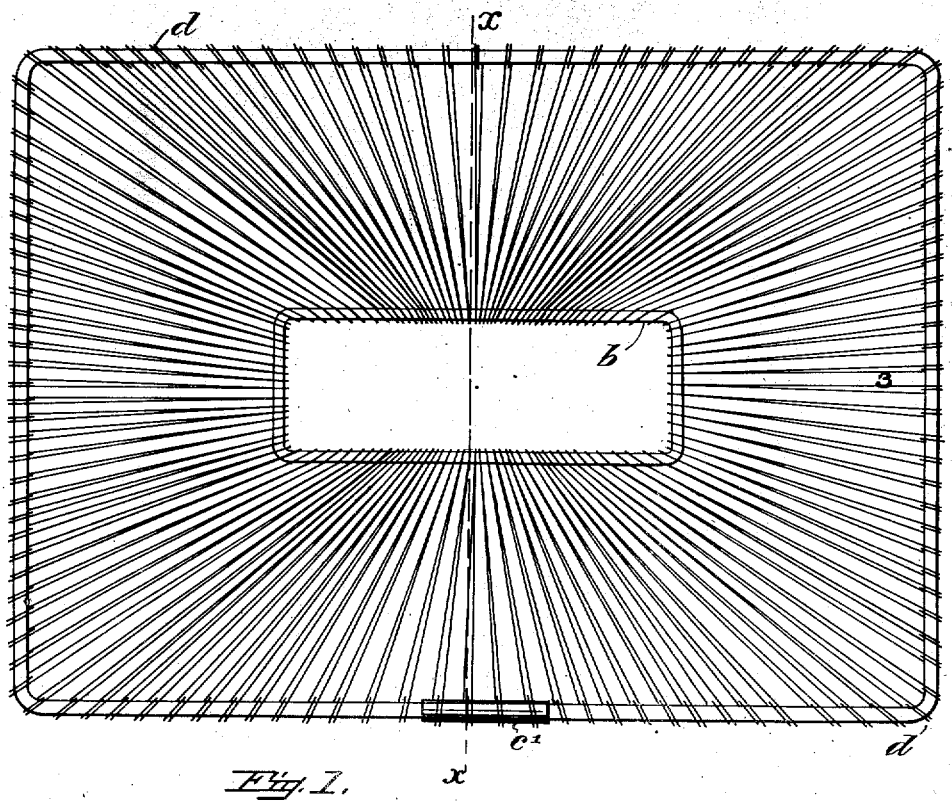
Figure 2:
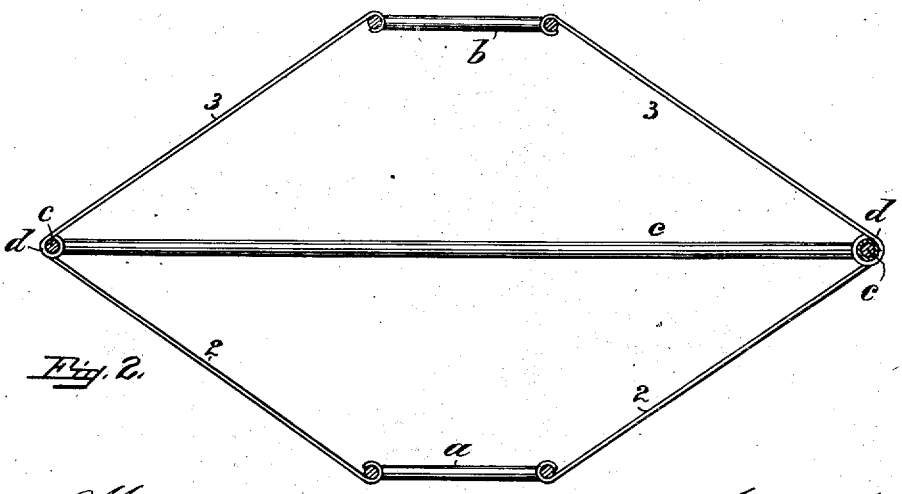

Figure 1 in top or plan view shows a pillow or cushion embodying one form of my invention; and Fig. 2, a section on the line *x x*, Fig. 1.

My improved pillow or cushion is shown as composed of a bottom frame *a*, a top frame *b*, and a central frame *c*, the latter frame, in the form in which my invention is herein shown, being made expansible, the said frames being represented as made from wire.

The shape or outlines of the frames *a b c* may be varied as desired, and the size and character of the wire may be varied, without departing from my invention so long as one of the three points to which the springs are connected is free to yield or expand as the springs are depressed.

The wire of which the frame *c* is made has its free ends extended loosely into preferably a guiding-sleeve *c'*, (shown only in Fig. 1,) into which said ends enter loosely and slide when the pillow is in use.

The frame *c* has connected to it a series of steel-wire springs *d*, the arms 2 3 of said springs being connected, respectively, with the frames *a* and *b*, the central parts of the said springs and also preferably the free ends of the wire springs being wound about said frames.

In use pressure or weight on the top of the pillow or cushion causes the part pressed upon to descend, and in so doing the expansible frame *c* yields, the ends of the said frame *c*, as herein illustrated, drawing at such time out of the collar *c'* the pillow or cushion, adapting its surface to the requirements of the weight upon it.

Having described my invention, what I claim as new, and desire to secure by Letters Patent, is—

1. A pillow or cushion composed of three frames or sections, one of which is expansible, and a series of spring wires connecting the same together, the expansible frame expanding under the action of the weight upon the pillow or cushion, substantially as described.

2. A pillow or cushion composed of three frames or sections, one of which is expansible, and located in different horizontal planes, and a series of spring wires each connected to all of the frames, the expansible frame expanding under the action of the weight upon the pillow or cushion, substantially as described.

3. In a pillow or cushion a series of spring wires bent between the ends thereof, and an expansible frame to which said spring wires are directly connected located in said bends and adapted to expand to the movement of said wires upon the compression thereof under the action of weight upon said pillow or cushion.

4. In a pillow or cushion, a series of spring wires bent between the ends thereof, an expansible frame to which said spring wires are directly connected located in said bends and adapted to expand to the movement of said wires upon the compression thereof under the action of weight upon said pillow or cushion, and means for supporting the free ends of said spring wires.

5. In a pillow or cushion, a series of spring wires each having a coil between its ends, an expansible frame to which said spring wires are directly connected located within the said coils and adapted to expand to the movement of said wires upon the compression thereof under the action of weight upon said pillow or cushion, a support for the upper free ends of said spring wires, and a support for the lower free ends of said spring wires.

6. A pillow or cushion composed of a series of two-armed spring wires each having a coil between its ends and an eye at each end, an expansible frame to which said spring wires are connected located within the coil of each spring wire and adapted to expand under the action of weight upon said pillow or cushion, and an upper and a lower frame to which the upper and lower ends of each spring wire are respectively connected.

In testimony whereof I have signed my name to the foregoing specification, in the presence of two subscribing witnesses, on this 27th day of July, A. D. 1895.

WILLIAM VOGLER.

Witnesses:
L. H. TROW,
E. L. HARLOW.